United States Patent
Van Rensburg

(10) Patent No.: US 9,387,463 B2
(45) Date of Patent: Jul. 12, 2016

(54) PROCESS FOR PREPARING A FISCHER-TROPSCH CATALYST

(71) Applicant: SASOL TECHNOLOGY (PROPRIETARY) LIMITED, Johannesburg (ZA)

(72) Inventor: Hendrik Van Rensburg, Fife (GB)

(73) Assignee: SASOL TECHNOLOGY (PROPRIETARY) LIMITED, Johannesburg (ZA)

( * ) Notice: Subject to any disclaimer, the term of this patent is extended or adjusted under 35 U.S.C. 154(b) by 0 days.

(21) Appl. No.: 14/438,070

(22) PCT Filed: Oct. 7, 2013

(86) PCT No.: PCT/IB2013/059167
§ 371 (c)(1),
(2) Date: Apr. 23, 2015

(87) PCT Pub. No.: WO2014/064563
PCT Pub. Date: May 1, 2014

(65) Prior Publication Data
US 2015/0273443 A1    Oct. 1, 2015

(30) Foreign Application Priority Data
Oct. 24, 2012 (ZA) .................. 2012/08038

(51) Int. Cl.
*C07C 27/00* (2006.01)
*B01J 23/89* (2006.01)
*B01J 37/08* (2006.01)
*B01J 37/18* (2006.01)
*B01J 23/75* (2006.01)
*B01J 37/00* (2006.01)
*C10G 2/00* (2006.01)

(52) U.S. Cl.
CPC ............ *B01J 23/8913* (2013.01); *B01J 23/75* (2013.01); *B01J 37/00* (2013.01); *B01J 37/08* (2013.01); *B01J 37/18* (2013.01); *C10G 2/332* (2013.01); *C10G 2/333* (2013.01)

(58) Field of Classification Search
CPC ........ B01J 23/8913; B01J 37/08; B01J 23/75; B01J 37/18; B01J 37/00; C10G 2/333; C10G 2/332
USPC ................................. 518/700, 715
See application file for complete search history.

(56) References Cited

U.S. PATENT DOCUMENTS 6,509,382 B1    1/2003   Ducreux et al.
2009/0221742 A1   9/2009   Hosokawa et al.

FOREIGN PATENT DOCUMENTS

WO        0020116        4/2000
WO     2006087522 A2     8/2006
WO     2011027104 A1     3/2011

OTHER PUBLICATIONS

Anderson, et al., "Studies of the Fischer-Tropsch Synthesis V. Activities and Surface Areas of Reduced and Carburized Cobalt Catalysts", "[Contribution From the Central Experiment Station, Bureau of Mines] XP55105742A", Jan. 1949, pp. 183-188, vol. 71, Published in: US.
Dai, et al., "Effects of Pretreatment and Reduction on the Co/A1xO3 Catalyst for CO Hydrogenation", "Journal of Natural Gas Chemistry XP25520252A", 2008, pp. 288-292, No. 17, Publisher: Elsevier, ScienceDirect.
Ducreux, et al., "Microstructure of Supported Cobalt Fischer-Tropsch Catalysts", "Oil & Gas Science and Technology—Rev. IFP", 2009, pp. 49-62, vol. 64, No. 1, Published in: FR.
European Patent Office PCT International Search Report, International Application No. PCT/IB2013/059167, mailed Apr. 8, 2014, Apr. 1, 2014.
Karaca, et al., "Structure and Catalytic Performance of PT-Promoted Alumina-Supported Cobalt Catalysts Under Realistic Conditions of Fischer-Tropsch Synthesis", "Journal of Catalysis XP27556280A", 2011, pp. 14-26, No. 277, Publisher: Elsevier.
Sadeqzadeh, et al., "Identification of the Active Species in the Working Alumina-Supported Cobalt Catalyst Under Various Conditions of Fischer-Tropsch Synthesis", "Catalysis Today", 2011, pp. 62-67, No. 164, Publisher: Elsevier B.V.

*Primary Examiner* — Jafar Parsa
(74) *Attorney, Agent, or Firm* — Fellers, Snider, Blankenship, Bailey & Tippens, P.C.

(57) ABSTRACT

A process for preparing a cobalt-containing hydrocarbon synthesis catalyst includes, in a carbide formation step, treating an initial catalyst precursor comprising a catalyst support supporting cobalt and/or a cobalt compound, with a CO containing gas at a temperature T. T is from 200° C. to 280° C. The cobalt or cobalt compound is converted to cobalt carbide thereby obtaining a cobalt carbide containing catalyst precursor. The CO containing gas (when it contains H2) does not have a CO to H2 molar ratio equal to or less than 33:1. The carbide formation step is carried out under non-oxidative conditions. In a subsequent activation step, the cobalt carbide containing catalyst precursor is subjected to treatment with a hydrogen containing gas at a temperature T2. T2 is at least 300° C. The cobalt carbide is converted to cobalt metal thereby activating the cobalt carbide containing catalyst precursor and obtaining a cobalt-containing hydrocarbon synthesis catalyst.

13 Claims, No Drawings

PROCESS FOR PREPARING A FISCHER-TROPSCH CATALYST

THIS INVENTION relates to catalysts. In particular, it relates to a process for preparing a cobalt-containing hydrocarbon synthesis catalyst, and to a process for producing hydrocarbons which includes using said hydrocarbon synthesis catalyst. The invention also relates to catalysts and products produced by the above processes.

BACKGROUND ART

Supported cobalt-containing hydrocarbon or Fischer-Tropsch synthesis (FTS) catalysts can be prepared by means of impregnation of a cobalt salt onto a catalyst support coupled with drying of the impregnated support, followed by calcination of the resultant dried impregnated support, to obtain a FTS catalyst precursor. The catalyst precursor is then activated under reduction conditions to obtain the FTS catalyst comprising cobalt metal crystallites dispersed on the support.

It is known that the activation conditions can be adapted to improve the activity of the eventual catalyst. The reduction conditions during activation are usually provided by hydrogen gas, but it is also known to use CO during activation. Khodakov A Y et al, in Journal of Catalysis, 277, 2011, 14-26, reported that standard $H_2$-reduction of cobalt oxide [$Co_3O_4$ (25% Co)/Pt(0.1%)/$Al_2O_3$] produces cobalt metal whereby, according to XRD measurements, the dominant phase is the cobalt face centred cubic (fcc) phase, accounting for approximately 80% of the cobalt metal with the remainder being the hexagonal close packed (hcp) phase. Treatment of the reduced (metallic) cobalt catalysts with pure CO at 220° C. leads to cobalt carbide ($Co_2C$) formation which is inactive towards FTS. However, subsequent $H_2$ treatment of the cobalt carbide at 220° C. results in the selective formation of the cobalt hcp phase. It is also accepted that the hcp phase is more active in FTS than the cobalt fcc phase and it is claimed by the authors that the $H_2$ treatment of cobalt carbide followed by FTS showed 50% higher activity than the corresponding catalyst without CO-treatment.

It is clear from the Khodakov A Y et al teaching that the cobalt hcp phase is the desired phase for FTS since it affords higher FTS activity. The hydrogen treatment of cobalt carbide mainly produces cobalt in the hcp phase and it is known from the Khodakov A Y et al teaching that this conversion of the cobalt carbide to cobalt in the hcp phase occurs quickly at a temperature of 220° C.

The present inventors found that hydrogen treatment of cobalt carbide at a temperature above 300° C. also results in the cobalt hcp phase being formed in a similar manner to when the hydrogen treatment is performed below 250° C. No improvements were observed in the formation of the cobalt hcp phase at the higher temperatures, but it was most unexpectedly found that when this cobalt carbide was treated with hydrogen at a temperature above 300° C., the catalyst so formed had a higher FTS catalyst activity and/or lower methane selectivity. The reasons for these improvements are not clear at this stage. Furthermore, it was surprisingly found that the temperature at which the cobalt carbide forms also has an effect on the FTS catalyst activity and/or methane selectivity.

Catalyst activation procedures which involve CO treatment and hydrogen treatment are also described in WO 2006/087522; U.S. Pat. No. 6,509,382; WO 2011/027104; Oil and Gas Science and Technology—Rev, IFP, Vol. 64 (2009), No 1, pp. 49-62; and Catal. Today 164 (2011) 62. However, none of these documents discloses the processes of the present invention, and especially not the combination of conditions under which the carbide formation takes place and the cobalt carbide is subsequently treated with hydrogen.

DISCLOSURE OF THE INVENTION

According to a first aspect of the present invention, there is provided a process for preparing a cobalt-containing hydrocarbon synthesis catalyst, which process includes
  in a carbide formation step, treating an initial catalyst precursor comprising a catalyst support supporting cobalt and/or a cobalt compound, with a CO containing gas at a temperature $T_1$, where $T_1$ is from 200° C. to 280° C., to convert the cobalt and/or cobalt compound to cobalt carbide thereby obtaining a cobalt carbide containing catalyst precursor, the CO containing gas (when it contains $H_2$) not having a CO to $H_2$ molar ratio equal to or less than 33:1, and the carbide formation step being carried out under non-oxidative conditions; and
  in a subsequent activation step, subjecting the cobalt carbide containing catalyst precursor to treatment with a hydrogen containing gas at a temperature $T_2$, where $T_2$ is at least 300° C., to convert the cobalt carbide to cobalt metal thereby activating the cobalt carbide containing catalyst precursor and obtaining a cobalt-containing hydrocarbon synthesis catalyst.

The Carbide Formation Step

Preferably, $T_1$ is above 210° C., and preferably below 280° C., preferably below 260° C., preferably below 250° C. Preferably, $T_1$ is from 220° C. to 250° C., preferably about 230° C.

The CO containing gas may thus contain hydrogen. However, as set out hereinbefore, when the CO containing gas contains hydrogen, it does not have a CO:$H_2$ molar ratio equal to or less than 33:1. In other words, when the CO containing gas contains $H_2$ it has a CO:$H_2$ molar ratio above 33:1.

However, the CO containing gas preferably does not contain $H_2$. It is believed that the presence of $H_2$ in the carbide formation step reduces, inhibits or prevents the formation of cobalt carbide.

The carbide formation is carried out under non-oxidative conditions to inhibit, preferably to prevent, the formation of one or more cobalt oxides. The CO containing gas may contain substantially no oxidation gas that will cause the formation of one or more cobalt oxides during the carbide formation step; preferably, it contains no such oxidation gas. The CO containing gas may contain substantially no $O_2$ or $O_2$-containing gas (for example air) that will cause the formation of one or more cobalt oxides during the carbide formation step; preferably, it contains no such $O_2$ or $O_2$-containing gas. It will be appreciated that the formation of one or more cobalt oxides during the carbide formation step is not desirable as it will reduce or inhibit the cobalt carbide formation.

In one preferred embodiment of the invention the CO containing gas is pure CO.

The CO partial pressure of the CO containing gas during the carbide formation step may be at atmospheric pressure or higher. Preferably the CO partial pressure is above 1 bar, preferably above 3 bar, preferably at about 6 bar.

Preferably, the treatment with the CO containing gas during the carbide formation step is for longer than 1 hour, preferably for longer than 3 hours.

Treating the initial catalyst precursor with the CO containing gas may be effected by contacting the initial catalyst precursor with the CO containing gas in any suitable manner. Preferably the initial catalyst precursor is provided in the form of a bed of particles of the initial catalyst precursor with the CO containing gas being caused to flow through the bed of particles. The bed of particles may be a fixed bed, but preferably it is a fluidised bed and preferably the CO containing gas acts as a fluidising medium for the bed of the initial catalyst precursor particles.

During the carbide formation step more than 30 mass % of the Co of the total cobalt may be provided as cobalt carbide, preferably more than 60 mass %, preferably more than 70 mass %.

The cobalt carbide may comprise $Co_2C$ and/or $Co_3C$.

Preferably, the cobalt carbide containing catalyst precursor is directly subjected to the activation step. By 'directly subjecting the cobalt carbide containing catalyst precursor to the activation step' is meant that the cobalt carbide containing catalyst precursor is subjected to the activation step without first subjecting the cobalt carbide containing catalyst precursor to heat treatment above 280° C. under oxidative conditions which causes oxidation of the cobalt carbide. Preferably, there is no such heat treatment of the cobalt carbide containing catalyst precursor above 280° C., preferably above 250° C., preferably from or above 200° C., preferably above 150° C., preferably above 100° C. under oxidative conditions which causes oxidation of the cobalt carbide. In one embodiment of the invention no heat treatment of the cobalt carbide containing catalyst precursor above 35° C. takes place under oxidative conditions which causes oxidation of the cobalt carbide. The oxidative conditions may be provided by an oxidation gas such as $O_2$ or an $O_2$-containing gas (for example air).

The Activation Step

Preferably, in the activation step, $T_2$ is above 320° C., preferably at least 350° C., and preferably below 500° C., preferably below 490° C. Preferably, $T_2$ is from 350° C. and below 500° C., preferably about 425° C.

The hydrogen containing gas may be pure hydrogen gas. Alternatively the hydrogen containing gas may consist of hydrogen and one or more inert gases which are inert in respect of the cobalt carbide during the activation step. The hydrogen containing gas preferably contains at least 90 volume % hydrogen.

Treating the cobalt carbide containing catalyst precursor with the hydrogen gas may be effected by contacting the hydrogen gas with the cobalt carbide containing catalyst precursor in any suitable manner. Preferably the cobalt carbide containing catalyst precursor is provided in the form of a bed of particles of the catalyst precursor with the hydrogen gas being caused to flow through the bed of particles. The bed of particles may be a fixed bed, but preferably it is a fluidised bed and preferably the hydrogen gas acts as a fluidising medium for the bed of cobalt carbide containing catalyst precursor particles.

The treatment with the hydrogen containing gas may be carried out at a pressure from 0.6 to 1.5 bar(a), preferably from 0.8 to 1.3 bar(a). Alternatively the pressure may be from 1.5 bar (a) to 20 bar(a).

During the activation step $T_2$ may be varied, and preferably it is increased to a maximum temperature as set out above, e.g. above 320° C. and below 500° C.

The activation step may be carried out in two or more stages, with one or both of the heating rate and the space velocity of the hydrogen containing gas being varied or changed when going from one stage to the next.

During the treatment with the hydrogen containing gas, the GHSV of the hydrogen gas is preferably from 1 to 100 liters per hour per gram of catalyst.

The Initial Catalyst Precursor

The process may include preparing the initial catalyst precursor by introducing a cobalt compound onto and/or into the catalyst support.

The cobalt compound introduced onto and/or into the catalyst support, or the cobalt compound being supported by the catalyst support, may be any suitable organic or inorganic compound of cobalt, preferably a cobalt salt. Preferably it is an inorganic compound, more preferably an inorganic salt of cobalt. The catalyst precursor compound may be cobalt nitrate, and particularly it may be $Co(NO_3)_2.6H_2O$.

The cobalt compound may be introduced onto and/or into the catalyst support by any suitable manner, but preferably it is by means of impregnation. Preferably the catalyst support is impregnated by the cobalt compound by forming a mixture of the cobalt compound; a liquid carrier for the cobalt compound; and the catalyst support.

The process may also include the step of contacting an acid (such as maleic acid) with the catalyst support prior to or simultaneously with the cobalt compound.

The liquid carrier may comprise a solvent for the cobalt compound and preferably the cobalt compound is dissolved in the liquid carrier. The liquid carrier may be water.

The liquid carrier may be an acidic liquid carrier, and preferably it is an acidic aqueous composition. The acidic liquid carrier may have a pH below 5, preferably below 3, and more preferably below 3. Preferably, the pH is above 1, more preferably above 1.8.

The impregnation may be effected by any suitable impregnation method, including incipient wetness impregnation or slurry phase impregnation. Slurry phase impregnation is preferred. Preferably the cobalt compound is dissolved in the liquid carrier in order that the volume of the solution is greater than xy liter, which solution is then mixed with the catalyst support, and wherein x is the BET pore volume of the catalyst support in ml/g support, and y is the mass of catalyst support to be impregnated in kg. Preferably the volume of the solution is greater than 1.5xy liter, and preferably it is about 2xy liter.

The impregnation may be carried out at sub-atmospheric pressure, preferably below 0.84 bar(a), more preferably at 0.30 bar(a) and lower.

Preferably the impregnation is carried out at a temperature above 25° C. Preferably the temperature is above 40° C., more preferably it is at least 60° C., but preferably not above 95° C.

The impregnation may be followed by partial drying of the impregnated support or the impregnation and drying may be carried out at the same time. Preferably the drying is carried out at a temperature above 25° C. Preferably the temperature is above 40° C., more preferably it is at least 60° C., but preferably not above 95° C. Preferably the partial drying may be effected at sub-atmospheric conditions, more preferably below 0.84 bar(a), most preferably at 0.30 bar(a) and lower.

In one embodiment of the invention, the impregnation and partial drying may be carried out using a procedure which includes a first step wherein the catalyst support is impregnated (preferably slurry impregnated) with the cobalt compound at a temperature above 25° C., and at sub-atmospheric pressure, and the resultant product is dried; and at least one subsequent step wherein the resulting partially dried product of the first step is subjected to treatment at a temperature above 25° C. and sub-atmospheric pressure, such that the temperature of the subsequent step exceeds that in the first step and/or the sub-atmospheric pressure in the subsequent step is lower than that in the first step. This two step impregnation may be the process as described in WO 00/20116, which is incorporated herein by reference.

In one embodiment of the invention the cobalt compound supported by the catalyst support of the initial catalyst precursor may be the cobalt compound as introduced onto and/or into the catalyst support, and may be any suitable organic or inorganic compound of cobalt as described above. In one embodiment of the invention the catalyst precursor in this form may be subjected to the carbide formation step.

In an alternative embodiment of the invention the cobalt compound supported by the catalyst support may be a cobalt compound which has been converted (for example by calcination) from the cobalt compound as introduced onto and/or into the catalyst support. In this embodiment of the invention the cobalt compound may be a cobalt oxide compound, including an oxy hydroxy compound of cobalt. The cobalt oxide compound may be a compound selected from the group consisting of CoO, CoO(OH), $Co_3O_4$, $Co_2O_3$ or a mixture of one or more thereof. Preferably the cobalt compound is selected from the group consisting of CoO, CoO(OH) and a mixture of CoO and CoO(OH).

The cobalt oxide compound may be formed by calcination of a catalyst support supporting a cobalt compound in the form of a cobalt salt.

The calcination may be effected in order to decompose the cobalt salt and/or to cause the cobalt salt to react with oxygen. For example, the cobalt salt (such as cobalt nitrate) may be converted into be a cobalt compound selected from CoO, CoO(OH), $Co_3O_4$, $Co_2O_3$ or a mixture of one or more thereof.

The calcination may be carried out in any suitable manner such as in a rotary kiln, a vertical furnace, or a fluidised bed reactor.

The calcination may be carried out in an inert atmosphere, but preferably it is carried out under oxidation conditions. Preferably the oxidation is carried out in the presence of oxygen, more preferably in air.

Preferably the calcination is carried out at a temperature above 95° C., more preferably above 120° C., still more preferably above 130° C., most preferably above 200° C., and preferably not above 400° C., more preferably not above 300° C.

The calcination may be carried out by using a heating rate and an air space velocity that comply with the following criteria:
(i) when the heating rate is ≤1° C./min, the air space velocity is at least 0.76 $m_n^3$/(kg Co($NO_3$)$_2$.6$H_2O$)/h; and
(ii) when the heating rate is higher than 1° C./min, the air space velocity satisfies the relation:

$$\log (\text{space velocity}) \geq \log 0.76 + \frac{\log 20 - \log 0.76}{2} \log (\text{heating rate})$$

The impregnation, the partial drying and the calcination may be repeated to achieve higher loadings of the catalyst precursor compound on the catalyst support.

In one embodiment of the invention the cobalt compound supported by the catalyst support of the initial catalyst precursor may be the cobalt oxide compound and in this embodiment of the invention the catalyst precursor in this form is subjected to the carbide formation step.

In an alternative embodiment of the invention the initial catalyst precursor comprises a catalyst support supporting cobalt. The cobalt may be formed in a reduction step wherein the initial catalyst precursor comprising a catalyst support supporting a cobalt compound is subjected to reduction in a reducing gas to reduce the cobalt compound to cobalt. The cobalt compound may be a cobalt salt as described above, but preferably it is a cobalt oxide compound as described above.

Preferably, the reducing gas is hydrogen or a hydrogen containing gas. The hydrogen containing gas may consist of hydrogen and one or more inert gases which are inert in respect of the active catalyst during the reduction step. The hydrogen containing gas preferably contains at least 90 volume % hydrogen.

The reducing gas may be contacted with the initial catalyst precursor including the cobalt compound in any suitable manner. Preferably the said initial catalyst precursor is provided in the form of a bed of particles of the initial catalyst precursor with the reducing gas being caused to flow through the bed of particles. The bed of particles may be a fixed bed, but preferably it is a fluidised bed and preferably the reducing gas acts as the fluidising medium for the bed of catalyst precursor particles.

The reduction may be carried out at a pressure from 0.6 to 1.5 bar(a), preferably from 0.8 to 1.3 bar(a). Alternatively the pressure may be from 1.5 bar (a) to 20 bar(a).

The reduction is preferably carried out at a temperature above 25° C. at which the cobalt compound will be reduced to cobalt metal. Preferably the activation is carried out at a temperature above 150° C., and preferably below 600° C. Preferably the reduction is carried out at a temperature below 500° C., preferably below 450° C.

During the reduction step the temperature may be varied, and preferably it is increased to a maximum temperature as set out above.

The flow of the reducing gas through the catalyst bed is preferably controlled to ensure that contaminants produced during reduction are maintained at a sufficiently low level. The reducing gas may be recycled, and preferably the recycled reducing gas is treated to remove one or more contaminants produced during reduction. The contaminants may comprise one or more of water and ammonia.

The reduction may be carried out in two or more stages, with one or both of the heating rate and the space velocity of the reducing gas being varied when going from one stage to the next.

During the reduction the water partial pressure is preferably kept as low as possible, preferably below 0.1 atmospheres. The hydrogen space velocity may be from 1 to 100 liters per hour per gram of catalyst.

The process may also include the steps of oxidising the initial catalyst precursor comprising the catalyst support supporting the cobalt to convert the cobalt to a cobalt oxide compound and then re-reducing the cobalt oxide compound to cobalt. The cobalt oxide compound may be a cobalt compound as described herein above. The said oxidising of the initial catalyst precursor may be any suitable oxidation procedure for converting the cobalt to a cobalt oxide. The re-reducing may be the same as the reduction carried out in the reduction step described hereinabove.

The initial catalyst precursor may also include a dopant capable of enhancing the reducibility of the cobalt compound. The dopant may be a metal selected from the group including palladium (Pd), platinum (Pt), ruthenium (Ru), rhenium (Re) and a mixture of one or more thereof. The mass proportion of the metal dopant (especially palladium metal or platinum metal) to the active component metal (especially cobalt metal) may be from 1:300 to 1:3000.

The dopant may be introduced during or after the introduction of the cobalt compound onto and/or into the catalyst support when preparing the initial catalyst precursor. The dopant may be introduced as a dopant compound which is a compound of a metal selected from the group including palladium (Pd), platinum (Pt), ruthenium (Ru), rhenium (Re) and a mixture of one or more thereof. Preferably the dopant compound is an inorganic salt, and preferably it is soluble in water.

The initial catalyst precursor can also be a spent FTS catalyst. A spent FTS catalyst is a catalyst that was exposed to FTS conditions for a certain period of time (e.g. weeks, months, years).

The initial catalyst precursor can also be a regenerated spent FTS catalyst. This is a spent FTS catalyst that has been oxidized in a regeneration process and subsequently reduced in hydrogen. It can also be a spent FTS catalyst that has been oxidized in a regeneration process.

The Catalyst Support

The catalyst support may be any catalyst support suitable for supporting the cobalt or a cobalt compound thereon.

The catalyst support is usually a porous support and preferably it is also pre-shaped. The support preferably has an average pore diameter between 8 and 50 nanometers, more preferably between 10 and 15 nanometers. The support pore volume may be between 0.1 and 1 ml/g catalyst support, more preferably between 0.3 and 0.9 ml/g catalyst support. The pre-shaped support may be a particulate support, preferably with an average particle size of between 1 and 500 micrometers, more preferably between 10 and 250 micrometers, still more particularly between 45 and 200 micrometers.

The catalyst support may comprise a catalyst support basis and optionally one or more modifying components. The catalyst support basis may be selected from the group consisting of alumina in the form of one or more aluminium oxides; silica ($SiO_2$); titania ($TiO_2$); magnesia (MgO); and zinc oxide (ZnO); and mixtures thereof. Preferably the support basis is selected from the group consisting of alumina in the form of one or more aluminium oxides; titania ($TiO_2$) and silica ($SiO_2$). More preferably the support basis is alumina in the form of one or more aluminium oxides. The support basis may be a commercially available product, for example Puralox (trade name) (available from Sasol Germany GmbH).

Preferably the catalyst support includes one or more modifying components. This is particularly the case where the support basis is soluble in a neutral and/or an acidic aqueous solution, or where the support basis is susceptible to hydrothermal attack as described below.

The modifying component may comprise a component that results in one or more of the following:
(i) decreasing the dissolution of the catalyst support in an aqueous environment,
(ii) suppressing the susceptibility of the catalyst support to hydrothermal attack (especially during Fischer-Tropsch synthesis);
(iii) increasing the pore volume of the catalyst support;
(iv) increasing the strength and/or attrition and/or abrasion resistance of the catalyst support.

In a preferred embodiment of the invention, the modifying component decreases the dissolution of the catalyst support in an aqueous environment and/or suppresses the susceptibility of the catalyst support to hydrothermal attack (especially during Fischer-Tropsch synthesis). Such an aqueous environment may include an aqueous acid solution and/or an aqueous neutral solution, especially such an environment encountered during an aqueous phase impregnation catalyst preparation step. Hydrothermal attack is considered to be the sintering of the catalyst support (for example aluminium oxide) during hydrocarbon synthesis, especially Fischer-Tropsch synthesis, due to exposure to high temperature and water.

The modifying component may include or consist of Si, Zr, Co, Ti, Cu, Zn, Mn, Ba, Ni, Na, K, Ca, Sn, Cr, Fe, Li, Ti, Sr, Ga, Sb, V, Hf, Th, Ce, Ge, U, Nb, Ta, W, La and mixtures of two or more thereof.

The modifying component may be selected from the group consisting of Si; Zr; Cu; Zn; Mn; Ba; La; W; Ni, Ti and mixtures of one or more thereof.

Preferably the modifying component is selected from the group consisting of Si and Zr. In a preferred embodiment of the invention, the modifying component is Si.

When the modifying component is Si, the silicon level in the resultant catalyst support may be at least 0.06 Si atoms per square nanometer of the catalyst support, preferably at least 0.13 Si atoms pre square nanometer of the catalyst support, and more preferably at least 0.26 Si atoms per square nanometer of the catalyst support.

Preferably the upper level is 2.8 Si atoms/$nm^2$ of the catalyst support.

In one preferred embodiment of the invention, the catalyst support comprises a catalyst support basis optionally including a modifying component selected from Si, Zr and W and with the catalyst support basis being selected from the group consisting of alumina in the form of one or more aluminium oxides; silica ($SiO_2$) and titania ($TiO_2$). Preferably the catalyst support basis is alumina in the form of one or more aluminium oxides and preferably it includes a modifying component which is preferably selected from Si, Zr, and W, more preferably Si. In one preferred embodiment of the invention, the catalyst support may be selected from alumina in the form of one or more aluminium oxides, silica ($SiO_2$), titania ($TiO_2$), magesia (MgO), silica modified aluminium oxide, and mixtures thereof. Preferably the support is a silica modified aluminium oxide, for example the product obtainable under the trademark Siralox from Sasol Germany GmbH. Siralox is a spray-dried silica containing aluminium oxide support. The silica modified aluminium oxide support may be the product described in U.S. Pat. No. 5,045,519 which is incorporated herein by reference.

The one or more aluminium oxides may be selected from the group including (preferably consisting of) gamma alumina, delta alumina, theta alumina and a mixture of two or more thereof. Preferably the group includes, or, preferably, consists of gamma alumina, delta alumina and a mixture of gamma alumina and delta alumina. The aluminium oxide catalyst support may be that obtainable under the trademark Puralox, preferably Puralox SCCa 2/150 from SASOL Germany GmbH. Puralox SCCa 2/150 (trademark) is a spray-dried aluminium oxide support consisting of a mixture of gamma and delta aluminium oxide.

The aluminium oxide is preferably a crystalline compound which can be described by the formula $Al_2O_3 \cdot xH_2O$ where $0<x<1$. The term 'aluminium oxide' thus excludes $Al(OH)_3$, and AlO(OH), but includes compounds such as gamma, delta and theta alumina.

In a preferred embodiment of the invention, the catalyst support or the catalyst support basis is not a zeolite.

The Cobalt-Containing Hydrocarbon Synthesis Catalyst

The cobalt-containing hydrocarbon synthesis catalyst may be a Fischer-Tropsch (FT) synthesis catalyst. The FT synthesis catalyst may be suitable for a process to be performed in a fixed bed reactor, slurry bed reactor or even a fixed fluidized bed reactor. Preferably the process is to be performed in a three phase slurry bed FT synthesis reactor.

The active cobalt-containing hydrocarbon synthesis catalyst may contain cobalt at a loading of from 5 to 70 g Co/100 g catalyst support, preferably from 20 to 40 g Co/100 g catalyst support, and more preferably from 25 to 35 g Co/100 g catalyst support.

In a most preferred embodiment of the invention, the active cobalt-containing hydrocarbon synthesis catalyst is not subjected to oxidation prior to using the said catalyst in hydrocarbon synthesis.

According to a second aspect of the present invention, there is provided a cobalt-containing hydrocarbon synthesis catalyst prepared according to the process of the first aspect of the invention.

Hydrocarbon Synthesis

According to a third aspect of the invention, there is provided a process for producing hydrocarbons, the process comprising preparing a cobalt-containing hydrocarbon synthesis catalyst according to the process of the first aspect of the invention; and contacting hydrogen with carbon monoxide at a temperature above 100° C. and at a pressure of at least 10 bar in the presence of the cobalt-containing hydrocarbon synthesis catalyst, thereby producing hydrocarbons and, optionally, oxygenates of hydrocarbons in a Fischer-Tropsch synthesis process.

The hydrocarbon production process may also include a hydroprocessing step for converting the hydrocarbons and optionally oxygenates thereof to liquid fuels and/or chemicals.

According to a fourth aspect of the present invention, there are provided products produced by the hydrocarbon production process according to the third aspect of the invention.

A catalyst prepared as described hereinabove may be subjected to rejuvenation by treating the catalyst with a reducing gas, once the catalyst has been subjected to hydrocarbon synthesis (preferably Fischer-Tropsch synthesis) and has lost at least some of its initial activity. The activation may take place at an elevated temperature and preferably, the reducing gas is $H_2$ or a $H_2$ containing gas. It was found that the catalyst as prepared according to the present invention is particularly suitable for rejuvenation and has reduced methane selectivity after rejuvenation compared to the initial catalyst.

The invention will now be described in more detail with reference to the following non-limiting examples.

EXAMPLES

Example 1

A cobalt based Fischer-Tropsch synthesis initial catalyst precursor with the composition 30 gCo/0.075 g Pt/100 g Si—$Al_2O_3$ was prepared.

The initial catalyst precursor was prepared as follows: In a first impregnation stage, $Co(NO_3)_2.6H_2O$ (39.5 g) and [Pt$(NH_4)_4(NO_3)_2$] (0.0248 g) were dissolved in 50 ml of distilled water. To the solution, 50 g of the Si—$Al_2O_3$ particulate support was added and the water then driven off by means of vacuum drying, while the temperature was increased from 60 to 85° C. Once dry, the sample was calcined at 250° C. using a fluidised bed with a flow of air for 6 hours. Then, in a second impregnation stage, the above steps were repeated using $Co(NO_3)_2.6H_2O$ (28.4 g) and [Pt$(NH_4)_4(NO_3)_2$] (0.0407 g) dissolved in 50 ml of distilled water, and to which 50 g of the calcined material from the first impregnation stage were added; followed by vacuum drying, while the temperature was increased from 60 to 85° C. The dry material was then calcined at 250° C. for another 6 hours in the same manner as for the first impregnation stage.

Example 2

101-R3 Baseline; Comparative

The initial catalyst precursor of Example 1 was loaded in a fixed bed reactor and activated by means of hydrogen (4000 ml/gcat/h) at atmospheric pressure and at a temperature of 425° C. for 7 hours, followed by cooling down to 230° C. in hydrogen. Fischer-Tropsch synthesis (FTS) was done in the same fixed bed reactor at 230° C. in a hydrogen/CO mixture at 16 bar. The FTS activity and methane selectivity are shown in Table 1.

Example 3

128-R1; Inventive

The initial catalyst precursor of Example 1 was activated at atmospheric pressure by means of the following procedure in a fixed bed reactor:

Increasing the temperature from 25 to 425° C. in hydrogen (4000 ml/gcat/h) at 1° C./min and a hold time of 7 hours at 425° C., followed by cooling down to 230° C. in hydrogen. Hydrogen was replaced by argon (20 min; 2000 ml/gcat/h). The argon was replaced by CO at 230° C.

In a carbide formation step, treatment in CO (4000 ml/gcat/h) at 230° C. for 22 hours. CO was replaced by argon (20 min; 2000 ml/gcat/h). The argon was replaced by hydrogen at 230° C.

In an activation step, increasing temperature from 230 to 425° C. in hydrogen (8000 ml/gcat/h) at 1° C./min and a hold time of 7 hours at 425° C., followed by cooling down to 230° C. in hydrogen.

Fischer-Tropsch synthesis (FTS) was done in the same fixed bed reactor at 230° C. in a hydrogen/CO mixture at 16 bar. The FTS activity and methane selectivity are shown in Table 1.

Example 4

152-R4; Inventive

The initial catalyst precursor of Example 1 was activated by means of the following procedure in a glass tube at atmospheric pressure:

Increasing temperature from 25 to 425° C. in hydrogen (4000 ml/gcat/h) at 1° C./min and a hold time of 7 hours at 425° C., followed by cooling down to 230° C. in hydrogen. Hydrogen was replaced by argon (20 min; 2000 ml/gcat/h). The argon was replaced by CO at 230° C.

In a carbide formation step, treatment in CO (4000 ml/gcat/h) at 230° C. for 22 hours. CO was replaced by argon (20 min; 2000 ml/gcat/h).

After cooling down to room temperature, the sample was passivated in 1% $O_2$/argon.

The passivated sample was loaded in a fixed bed reactor and in an activation step, the temperature was increased from room temperature to 425° C. in hydrogen (8000 ml/gcat/h) at 1° C./min and a hold time of 7 hours at 425° C., followed by cooling down to 230° C. in hydrogen.

Fischer-Tropsch synthesis (FTS) was done in the same fixed bed reactor at 230° C. in a hydrogen/CO mixture at 16 bar. The FTS activity and methane selectivity are shown in Table 1.

Example 5

152-R3; Inventive

This sample was prepared as for that of Example 4, except that the last activation step was executed at 350° C. instead of at 425° C.

Example 5A

152-R2; Inventive

This sample was prepared as for that of Example 4, except that the last activation step was executed at 300° C. instead of at 425° C.

Example 6

152-R1; Comparative

This sample was prepared as for that of Example 4, except that the last activation step was executed at 250° C. instead of at 425° C.

TABLE 1

| Catalyst | Run number | T in activation step (° C.) | Relative FTS activity[1] | Relative $CH_4$ selectivity[1] |
|---|---|---|---|---|
| Example 2 (comparative) | 101-R3 | — | 1.00 | 1.00 |
| Example 3 (inv) | 128-R1 | 425 | 1.63 | 0.76 |
| Example 4 (inv) | 152-R4 | 425 | 1.71 | 0.78 |
| Example 5 (inv) | 152-R3 | 350 | 1.07 | 1.00 |
| Example 5A (inv) | 152-R2 | 300 | 1.00 | 1.10 |
| Example 6 (comparative) | 152-R1 | 250 | 0.84 | 1.19 |

[1]Expressed relative to Example 2 after 2 days on line. Errors are for relative activity +/− 0.08; for relative $CH_4$ selectivity 0.05

Table 1 thus shows that using an activation step temperature of at least 300° C. provides a catalyst with increased activity (up to 63-71%) and/or an improved and lower methane selectivity (up to 22-24%).

Example 7

158-R1; Comparative

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 230° C. in hydrogen. Hydrogen was replaced by argon (20 min; 2000 ml/gcat/h). The argon was replaced by CO at 230° C.
In a carbide formation step, treatment in CO (6000 ml/gcat/h) at 230° C. for 6 hours at 6 bar. CO was replaced by argon (20 min; 2000 ml/gcat/h). The argon was replaced by hydrogen at 230° C.
In an activation step, increasing temperature from 230 to 250° C. in hydrogen (8000 ml/gcat/h) at 1° C./min, atmospheric pressure, and a hold time of 10 hours at 250° C., followed by cooling down to 230° C. in hydrogen.

Example 8

158-R2; Inventive

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 230° C. in hydrogen. Hydrogen was replaced by argon (20 min; 2000 ml/gcat/h). The argon was replaced by CO at 230° C.
In a carbide formation step, treatment in CO (6000 ml/gcat/h) at 230° C. for 6 hours at 6 bar. CO was replaced by argon (20 min; 2000 ml/gcat/h). The argon was replaced by hydrogen at 230° C.
In an activation step, increasing temperature from 230 to 300° C. in hydrogen (8000 ml/gcat/h) at 1° C./min, at atmospheric pressure, and a hold time of 9 hours at 300° C., followed by cooling down to 230° C. in hydrogen.

Example 9

158-R3; Inventive

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 230° C. in hydrogen. Hydrogen was replaced by argon (20 min; 2000 ml/gcat/h). The argon was replaced by CO at 230° C.
In a carbide formation step, treatment in CO (6000 ml/gcat/h) at 230° C. for 6 hours at 6 bar. CO was replaced by argon (20 min; 2000 ml/gcat/h). The argon was replaced by hydrogen at 230° C.
In an activation step, increasing temperature from 230 to 350° C. in hydrogen (8000 ml/gcat/h) at 1° C./min, at atmospheric pressure, and a hold time of 8 hours at 350° C., followed by cooling down to 230° C. in hydrogen.

Example 10

154-R2; Inventive

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 230° C. in hydrogen. Hydrogen was replaced by argon (20 min; 2000 ml/gcat/h). The argon was replaced by CO at 230° C.
In a carbide formation step, treatment in CO (6000 ml/gcat/h) at 230° C. for 6 hours at 6 bar. CO was replaced by argon (20 min; 2000 ml/gcat/h). The argon was replaced by hydrogen at 230° C.
In an activation step, increasing temperature from 230 to 425° C. in hydrogen (8000 ml/gcat/h) at 1° C./min, at atmospheric pressure, and a hold time of 7 hours at 425° C., followed by cooling down to 230° C. in hydrogen.

Examples 7-10 were tested for Fischer-Tropsch synthesis (FTS) at 230° C. in a hydrogen/CO mixture at 16 bar, directly after the last part of the activation step, in the same fixed bed reactor. The FTS activity and methane selectivity are shown in Table 2.

TABLE 2

| Catalyst | Run number | T in activation step (° C.) | Relative FTS activity[1] | Relative CH$_4$ selectivity[1] |
|---|---|---|---|---|
| Example 2 (comparative) | 101-R3 | — | 1.00 | 1.00 |
| Example 7 (comparative) | 158-R1 | 250 | 1.32 | 0.90 |
| Example 8 (inv) | 158-R2 | 300 | 1.43 | 0.82 |
| Example 9 (inv) | 158-R3 | 350 | 1.57 | 0.75 |
| Example 10 (inv) | 154-R2 | 425 | 1.68 | 0.72 |

[1]Expressed relative to Example 2 after 2 days on line. Errors are for relative activity +/−0.08; for relative CH$_4$ selectivity 0.05

Table 2 thus shows that using an activation step temperature of at least 300° C. provides a catalyst with increased activity (up to 68%) and an improved and lower methane selectivity (up to 28%).

Example 11

155-R3; Comparative

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 180° C. in hydrogen. Hydrogen was replaced by argon (20 min; 2000 ml/gcat/h). The argon was replaced by CO at 180° C.
In a carbide formation step, treatment in CO (6000 ml/gcat/h) at 180° C. for 6 hours at 6 bar. CO was replaced by argon (20 min; 2000 ml/gcat/h). The argon was replaced by hydrogen at 180° C.
In an activation step, increasing temperature from 180 to 425° C. in hydrogen (8000 ml/gcat/h) at 1° C./min, at atmospheric pressure, and a hold time of 7 hours at 425° C., followed by cooling down to 230° C. in hydrogen.

Example 12

155-R1; Inventive

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 200° C. in hydrogen. Hydrogen was replaced by argon (20 min; 2000 ml/gcat/h). The argon was replaced by CO at 200° C.
In a carbide formation step, treatment in CO (6000 ml/gcat/h) at 200° C. for 6 hours at 6 bar. CO was replaced by argon (20 min; 2000 ml/gcat/h). The argon was replaced by hydrogen at 200° C.
In an activation step, increasing temperature from 200 to 425° C. in hydrogen (8000 ml/gcat/h) at 1° C./min, at atmospheric pressure, and a hold time of 7 hours at 425° C., followed by cooling down to 230° C. in hydrogen Example 13

155-R2; Inventive

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 180° C. in hydrogen. Hydrogen was replaced by argon (20 min; 2000 ml/gcat/h). The argon was replaced by CO at 220° C.
In a carbide formation step, treatment in CO (6000 ml/gcat/h) at 220° C. for 6 hours at 6 bar. CO was replaced by argon (20 min; 2000 ml/gcat/h). The argon was replaced by hydrogen at 220° C.
In an activation step, increasing temperature from 220 to 425° C. in hydrogen (8000 ml/gcat/h) at 1° C./min, at atmospheric pressure, and a hold time of 7 hours at 425° C., followed by cooling down to 230° C. in hydrogen Example 14

139-R1; Inventive

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 180° C. in hydrogen. Hydrogen was replace by argon (20 min; 2000 ml/gcat/h). The argon was replaced by CO at 230° C.
In a carbide formation step, treatment in CO (6000 ml/gcat/h) at 230° C. for 6 hours at 6 bar. CO was replaced by argon (20 min; 2000 ml/gcat/h). The argon was replaced by hydrogen at 230° C.
In an activation step, increasing temperature from 230 to 425° C. in hydrogen (8000 ml/gcat/h) at 1° C./min, at atmospheric pressure, and a hold time of 7 hours at 425° C., followed by cooling down to 230° C. in hydrogen Example 15

155-R4; Inventive

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 180° C. in hydrogen. Hydrogen was replaced by argon (20 min; 2000 ml/gcat/h). The argon was replaced by CO at 250° C.
In a carbide formation step, treatment in CO (6000 ml/gcat/h) at 250° C. for 6 hours at 6 bar. CO was replaced by argon (20 min; 2000 ml/gcat/h). The argon was replaced by hydrogen at 250° C.
In an activation step, increasing temperature from 250 to 425° C. in hydrogen (8000 ml/gcat/h) at 1° C./min, at atmospheric pressure, and a hold time of 7 hours at 425° C., followed by cooling down to 230° C. in hydrogen Example 16

167-R1; Inventive

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 180° C. in hydrogen. Hydrogen was replaced by argon (20 min; 2000 ml/gcat/h). The argon was replaced by CO at 260° C.

In a carbide formation step, treatment in CO (6000 ml/gcat/h) at 260° C. for 6 hours at 6 bar. CO was replaced by argon (20 min; 2000 mlg/cat/h). The argon was replaced by hydrogen at 260° C.

In an activation step, increasing temperature from 260 to 425° C. in hydrogen (8000 ml/gcat/h) at 1° C./min, at atmospheric pressure, and a hold time of 7 hours at 425° C., followed by cooling down to 230° C. in hydrogen Example 17

167-R2; Inventive

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 180° C. in hydrogen. Hydrogen was replaced by argon (20 min; 2000 ml/gcat/h). The argon was replaced by CO at 280° C.
In a carbide formation step, treatment in CO (6000 ml/gcat/h) at 280° C. for 6 hours at 6 bar. CO was replaced by argon (20 min; 2000 ml/gcat/h). The argon was replaced by hydrogen at 280° C.
In an activation step, increasing temperature from 280 to 425° C. in hydrogen (8000 ml/gcat/h) at 1° C./min, at atmospheric pressure, and a hold time of 7 hours at 425° C., followed by cooling down to 230° C. in hydrogen Example 18

167-R3; Comparative

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 180° C. in hydrogen. Hydrogen was replaced by argon (20 min; 2000 ml/gcat/h). The argon was replaced by CO at 300° C.
In a carbide formation step, treatment in CO (6000 ml/gcat/h) at 300° C. for 6 hours at 6 bar. CO was replaced by argon (20 min; 2000 ml/gcat/h). The argon was replaced by hydrogen at 300° C.
In an activation step, increasing temperature from 300 to 425° C. in hydrogen (8000 ml/gcat/h) at 1° C./min, at atmospheric pressure, and a hold time of 7 hours at 425° C., followed by cooling down to 230° C. in hydrogen Examples 11-18 were tested for Fischer-Tropsch synthesis (FTS) at 230° C. in a hydrogen/CO mixture at 16 bar, directly after the last part of the activation step, in the same fixed bed reactor. The FTS activity and methane selectivity are shown in Table 3.

TABLE 3

| Catalyst | Run number | T in carbide formation step (° C.) | Relative FTS activity[1] | Relative CH$_4$ selectivity[1] |
|---|---|---|---|---|
| Example 11 (comparative) | 155-R3 | 180 | 1.00 | 1.00 |
| Example 12 (inv) | 155-R1 | 200 | 1.16 | 0.89 |
| Example 13 (inv) | 155-R2 | 220 | 1.57 | 0.73 |
| Example 14 (inv) | 139-R1 | 230 | 1.74 | 0.67 |
| Example 15 (inv) | 155-R4 | 250 | 1.44 | 0.75 |
| Example 16 (inv) | 167-R1 | 260 | 1.39 | 0.78 |
| Example 17 (inv) | 167-R2 | 280 | 1.25 | 0.93 |
| Example 18 (comparative) | 167-R3 | 300 | 1.08 | 1.12 |

[1]Expressed relative to Example 11 after 3 days on line. Errors are for relative activity +/− 0.08; for relative CH$_4$ selectivity 0.05

Table 3 thus shows that using a carbide formation step temperature of from 200° C. to 280° C. provides a catalyst with increased activity (up to 74%) and an improved and lower methane selectivity (up to 33%).

Example 19

168-R1; Comparative

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 7 hours at 425° C., followed by cooling down to 230° C. in hydrogen.
Hydrogen was replaced by CO/hydrogen mixture (6000 ml/gcat/h) with a CO:H$_2$ molar ratio of 33:1 at 230° C.
In a carbide formation step, treatment in CO/hydrogen mixture with a CO:H$_2$ molar ratio of 33:1 at 230° C. for 6 hours at 6 bar.
CO/hydrogen mixture with a CO:H$_2$ molar ratio of 33:1 was replaced by hydrogen at 230° C.
In an activation step, increasing temperature from 230 to 425° C. in hydrogen (8000 ml/gcat/h) at 1° C./min, at atmospheric pressure, and a hold time of 7 hours at 425° C., followed by cooling down to 230° C. in hydrogen.
Fischer-Tropsch synthesis (FTS) was performed at 230° C. in a hydrogen/CO mixture at 16 bar. The FTS activity and methane selectivity are shown in Table 4.

Example 20

168-R2; Comparative

This example was executed in the same manner as Example 19, except that the CO/hydrogen mixtures had a CO:H$_2$ molar ratio of 10:1.

Example 21

168-R3; Comparative

This example was executed in the same manner as Example 19, except that the CO/hydrogen mixtures had a CO:H$_2$ molar ratio of 6.2:1.

Example 22

168-R4; Comparative

This example was executed in the same manner as Example 19, except that the CO/hydrogen mixtures had a CO:H$_2$ molar ratio of 3.8:1.

TABLE 4

| Catalyst | Run number | CO/H$_2$ inlet ratio in carbide formation step (° C.) | Relative FTS activity[1] | Relative CH$_4$ selectivity[1] |
|---|---|---|---|---|
| Example 2 (comparative) | 101-R3 | NA[2] | 1.00 | 1.00 |
| Example 19 (comparative) | 168-R1 | 33 | 1.04 | 1.03 |
| Example 20 (comparative) | 168-R2 | 10 | 1.00 | 1.00 |
| Example 21 (comparative) | 168-R3 | 6.8 | 0.98 | 1.00 |
| Example 22 (comparative) | 168-R4 | 3.8 | 0.95 | 1.04 |
| Example 14 (inventive) | 139-R1 | infinite [3] | 1.74 | 0.67 |

[1]Expressed relative to Example 2 after 2 days on line. Errors are for relative activity +/− 0.08; for relative CH$_4$ selectivity 0.05
[2]NA = not applicable, as there was no carbide formation step.
[3] If there is no hydrogen present, the ratio will be infinite Table 4 thus shows that the presence of hydrogen (at a CO/H$_2$ molar ratio of 33:1 or less) during the carbide formation step provides a catalyst with no beneficial effects compared to comparative Example 2.

Example 23

Comparative

An initial catalyst precursor sample prepared according to the procedures from Example 1, except that an organic additive was added to the impregnation liquid, was activated by means of hydrogen at atmospheric pressure and at a temperature of 425° C. for 16 hours, followed by cooling down to room temperature in hydrogen and unloading of the catalyst in molten wax under an argon atmosphere.

Example 24

(Inventive; BD277)(CATregen 15)

A catalyst sample from Example 23 was used for FTS for an extended period of time. The spent catalyst from this FTS run was dewaxed and oxidized in air at 250° C. for 2 hours and cooled down to room temperature, resulting in a regenerated catalyst containing alumina supported cobalt oxide.

This oxidized catalyst sample was reduced in hydrogen by increasing the temperature from room temperature to 425° C. at 1° C./min and held at 425° C. for 5 hours, followed by cooling down to 218° C. This resulted in the initial catalyst precursor.

The hydrogen was replaced by argon and the system was flushed for 1 hour. Then the argon was replaced by carbon monoxide (at atmospheric pressure) and the temperature was increased to 230° C. and was held at 230° C. for 24 hours, followed by cooling down to 178° C. At 178° C. the system was flushed with argon for 1 hour. Hereafter the carbide containing catalyst was activated in hydrogen by increasing the temperature from 178 to 425° C. at 1° C./min, and was held at 425° C. for 9 hours. This was followed by cooling down to room temperature, whereafter the catalyst was unloaded in molten wax under an argon atmosphere.

Example 25

(Comparative; BD271) (CatRegen 13)

A catalyst sample from Example 23 was used for FTS for an extended period of time. The spent catalyst from this FTS run was dewaxed and oxidized in air at 250° C. for 2 hours and cooled down to room temperature, resulting in a regenerated catalyst containing alumina supported cobalt oxide.

This oxidized catalyst sample was reduced in hydrogen by increasing the temperature from room temperature to 425° C. at 1° C./min and held at 425° C. for 16 hours. This was followed by cooling down to room temperature and the catalyst was unloaded in molten wax under an argon atmosphere.

The wax coated activated catalyst samples of Examples 24-25 were loaded into a laboratory slurry CSTR reactor and Fischer-Tropsch synthesis (FTS) was performed at 230° C. in a hydrogen/CO mixture at 20 bar. The relative FTS activity and methane selectivity are shown in Table 5.

TABLE 5

| Catalyst | Run number | Sample type | Relative FTS activity[1] | Relative CH$_4$ selectivity[1] |
|---|---|---|---|---|
| Example 24 (inventive) | BD277 | Regenerated catalyst | 1.84 | 0.76 |
| Example 25 (comparative) | BD271 | Regenerated catalyst | 1.00 | 1.00 |

[1]Expressed relative to Example 25 after 2 days on line. Errors are for relative activity +/− 0.05; for relative CH$_4$ selectivity 0.03

Table 5 thus shows that using an activation procedure according to the invention (i.e. carbide formation step in CO at 230° C. and re-activation in H$_2$ at 425° C.) for a regenerated catalyst provides a catalyst with increased activity (up to 84%) and an improved and lower methane selectivity (up to 24%).

Example 26

Inventive; CA116

The initial catalyst precursor of Example 1 was activated by means of the following procedure in a glass tube at atmospheric pressure:

Increasing temperature from 25 to 425° C. in hydrogen (4000 ml/gcat/h) at 1° C./min and a hold time of 7 hours at 425° C., followed by cooling down to 230° C. in hydrogen. Hydrogen was replaced by argon (20 min; 2000 ml/gcat/h). The argon was replaced by CO at 230° C.

In a carbide formation step, treatment in CO (4000 ml/gcat/h) at 230° C. for 22 hours. CO was replaced by argon (20 min; 2000 ml/gcat/h).

After cooling down to room temperature, the sample was passivated in 1% O$_2$/argon.

The passivated catalyst sample was reduced in hydrogen by increasing the temperature from 25 to 425° C. in hydrogen at 1° C./min, atmospheric pressure, and a hold time of 4 hours at 425° C., followed by cooling down to room temperature in hydrogen and the catalyst was unloaded in wax under an argon atmosphere.

Example 26A

Comparative; BJ052

An initial catalyst precursor sample prepared according to the procedures of Example 1, was activated by means of hydrogen at atmospheric pressure and at a temperature of 425° C. for 16 hours, followed by cooling down to room temperature in hydrogen whereafter the catalyst was unloaded in molten wax under an argon atmosphere.

The wax coated activated catalyst samples of Example 26 and 26A were loaded into a laboratory slurry CSTR reactor and Fischer-Tropsch synthesis (FTS) was performed at 230° C. in a hydrogen/CO mixture at 20 bar. The relative FTS activity and methane selectivity are shown in Table 6.

TABLE 6

| Catalyst | Run number | Relative FTS activity[1] | Relative CH$_4$ selectivity[1] |
|---|---|---|---|
| Example 26A (comparative) | BJ052 | 1.00 | 1.00 |
| Example 26 (inventive) | CA116 | 1.25 | 1.00 |

[1]Expressed relative to Example 26A after 2 days on line. Errors are for relative activity +/− 0.05; for relative CH$_4$ selectivity 0.03

Table 6 thus shows that using an activation procedure according to the invention (i.e. carbide formation step in CO at 230° C. and re-activation in H$_2$ at 425° C.) provides a catalyst with increased activity (up to 25%) as tested in a micro slurry CSTR reactor.

Example 27

Comparative; 148-R1

An initial catalyst precursor sample of Example 1 was activated in the same manner as described in Example 2 and subsequently run for FTS for an extended period. The spent catalyst sample was removed from the FTS reactor and the wax was removed by means of solvent wash.

The spent catalyst sample was loaded in a fixed bed reactor and activated by means of hydrogen at atmospheric pressure and at a temperature of 425° C. for 7 hours, followed by cooling down to 230° C. in hydrogen. Fischer-Tropsch synthesis (FTS) was done in the same fixed bed reactor at 230° C. in a hydrogen/CO mixture at 16 bar. The FTS activity and methane selectivity are shown in Table 7.

Example 28

Inventive; 166-R1

The same spent catalyst sample from Example 27, after solvent wash, was loaded in a fixed bed reactor and activated as follows:

Hydrogen treatment up to 425° C. and hold at 425° C. for 7 hours

Cool down to 200° C. in hydrogen and change gas at 200° C. to argon (for 20 minutes)

CO treatment at 230° C. and 6 bar CO for 6 hours.

Decrease pressure to atmospheric pressure under CO and cool down to 180° C.

Replace CO with Ar (10 min).

Replace argon with hydrogen and activate in hydrogen up to 425° C. and keep at 425° C. for 7 hours.

Cool down in hydrogen to 230° C.

Fischer-Tropsch synthesis (FTS) was done in the same fixed bed reactor at 230° C. in a hydrogen/CO mixture at 16 bar.

The FTS activity and methane selectivity are shown in Table 7.

TABLE 7

| Catalyst | Run number | Relative FTS activity[1] | Relative CH$_4$ selectivity[1] |
|---|---|---|---|
| Example 27 (comparative) | 148-R1 | 1.00 | 1.00 |
| Example 28 (inventive) | 166-R1 | 1.54 | 0.74 |

[1]Expressed relative to Example 27 after 2 days on line. Errors are for relative activity +/− 0.08; for relative CH$_4$ selectivity 0.05

Table 7 thus shows that using an activation procedure according to the invention (i.e. carbide formation step in CO at 230° C. and re-activation in H$_2$ at 425° C.) for a spent cobalt FT catalyst provides a catalyst with increased activity (up to 58%) and an improved and lower methane selectivity (up to 25%).

Example 29

Run 170R4; Inventive

The initial catalyst precursor of Example 1 was activated by means of the following procedure in a fixed bed reactor:

Increasing temperature from 25 to 425° C. in hydrogen (4000 ml/gcat/h) at 1° C./min, atmospheric pressure, and a hold time of 5 hours at 425° C., followed by cooling down to 230° C. in hydrogen. Hydrogen was replaced by argon (20 min; 2000 ml/gcat/h). The argon was replaced by CO at 230° C.

In a carbide formation step, treatment in CO (6000 ml/gcat/h) at 230° C. for 30 min at 6 bar. CO was then replaced by argon (2000 ml/gcat/h) at 230° C. for 5 h. Ar was then replaced by H$_2$ at 230° C.

In an activation step, increasing temperature from 230 to 425° C. in hydrogen (8000 ml/gcat/h) at 1° C./min, at atmospheric pressure, and a hold time of 7 hours at 425° C., followed by cooling down to 230° C. in hydrogen.

Example 29 was tested for Fischer-Tropsch synthesis (FTS) at 230° C. in a hydrogen/CO mixture at 16 bar. The relative FTS activity and methane selectivity are shown in Table 8.

TABLE 8

| Catalyst | Run number | Relative FTS activity[1] | Relative CH$_4$ selectivity[1] |
|---|---|---|---|
| Example 2 (comparative) | 101-R3 | 1.00 | 1.00 |
| Example 29 (inventive) | 170-R4 | 1.36 | 0.79 |

[1]Expressed relative to Example 2 after 2 days online. Errors are for relative activity +/− 0.08; for relative CH$_4$ selectivity 0.05

Example 30

In-situ XRD analyses (at atmospheric pressure) were performed on the initial catalyst precursor of Example 1, and a catalyst obtained therefrom using the activation procedure of the present invention. At first, the calcined material was reduced in hydrogen at atmospheric pressure and at 425° C. showing the disappearance of the Co$_3$O$_4$ phase and the appearance of the Co metal fcc and hcp phases (about 60 and 40% of total cobalt abundance respectively). In helium the temperature was reduced to 230° C. At 230° C. the gas was changed from helium to carbon monoxide. This resulted in the conversion of (part of) the cobalt metal phases to cobalt carbide (Co$_2$C). After 22 hours the gas was changed from carbon monoxide to helium, and the temperature was decreased from 230 to 140° C. At 140° C. the gas was changed from helium to hydrogen. Subsequently the temperature was slowly increased in hydrogen. It was observed that below 180° C. the cobalt carbides decomposed and formed mainly the cobalt hcp metal phase. Increasing the temperature further to 425° C. did not cause any further substantial changes to the cobalt phases (see Table 9).

TABLE 9

XRD determined cobalt phase contents (as part of total catalyst composition) during in-situ hydrogen activation, after CO carbide formation at 230° C. (XRD analysis run Ec11b).

| Temperature (C) | $Co_2C$ (m %) | hcp Co (m %) | fcc Co (m %) |
|---|---|---|---|
| 140 | 12 | 0 | 2 |
| 160 | 9 | 1 | 3 |
| 180 | 0 | 15 | 3 |
| 240 | 0 | 16 | 2 |
| 300 | 0 | 17 | 3 |
| 360 | 0 | 15 | 2 |
| 400 | 0 | 15 | 2 |
| 425 | 0 | 15 | 3 |

This Example 30 and Table 9 show that during the hydrogen activation step (i.e. after the carbide formation step) the cobalt carbide is decomposed below 200° C. into Co hcp metal phase and no significant changes occur anymore upon heating up from 180 to 425° C.

Example 31

211R2; Comparative

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 200° C. in hydrogen. Hydrogen was replaced by argon (20 min; 8000 ml/gcat/h). The argon was replaced by $CO/O_2/N_2$ mixture at 200° C.
In a carbide formation step, treatment in $CO/O_2/N_2$ (volume ratio 100/88/350; 11000 ml/gcat/h). Temperature was increased from 200 to 230° C., and kept at 230° C. for 6 hours at 6 bar. $CO/O_2/N_2$ mixture was replaced by argon (20 min; 8000 ml/gcat/h). The argon was replaced by hydrogen at 230° C.
In an activation step, increasing temperature from 230 to 425° C. in hydrogen (8000 ml/gcat/h) at 1° C./min, at atmospheric pressure, and a hold time of 7 hours at 425° C., followed by cooling down to 230° C. in hydrogen.

Example 31 was tested for Fischer-Tropsch synthesis (FTS) at 230° C. in a hydrogen/CO mixture at 16 bar. The relative FTS activity and methane selectivity are shown in Table 10.

TABLE 10

| Catalyst | Run number | $CO:O_2$ ratio during carbiding step | Relative FTS activity[1] | Relative $CH_4$ selectivity[1] |
|---|---|---|---|---|
| Example 2 (comparative) | 101-R3 | — | 1.00 | 1.00 |
| Example 10 (inventive) | 154-R2 | 100:0 | 1.65 | 0.70 |

TABLE 10-continued

| Catalyst | Run number | $CO:O_2$ ratio during carbiding step | Relative FTS activity[1] | Relative $CH_4$ selectivity[1] |
|---|---|---|---|---|
| Example 31 (comparative) | 211-R2 | 100:88 | 1.0 | 1.0 |

[1]Expressed relative to Example 2 after 1 day online. Errors are for relative activity +/− 0.08; for relative $CH_4$ selectivity 0.05

Table 10 clearly shows that the carbide formation step should be executed under non-oxidative conditions, as using oxidative conditions (Example 31) does not give any improvement over the comparative Example 2 where no carbiding step was done.

Example 32

204-R2; Inventive

The initial catalyst precursor of Example 1 was activated by means of the following procedure in a fixed bed reactor:
Increasing temperature from 25 to 425° C. in hydrogen (4000 ml/gcat/h) at 1° C./min, atmospheric pressure, and a hold time of 5 hours at 425° C., followed by cooling down to 200° C. in hydrogen. Hydrogen was replaced by argon (15 min; 2000 ml/gcat/h). The argon was replaced by CO at 200° C.
In a carbide formation step, treatment in CO (6000 ml/gcat/h), increasing temperature from 200 to 230° C., and kept at 230° C. for 6 hours at 6 bar.
Reduce pressure from 6 to 1 bar under CO flow (2000 ml/gcat/h), and decrease temperature to 200° C.
Replace CO flow by a 10% $O_2$/He flow (3000 ml/gcat/h), and flow for 2 hours.
Replace 10% $O_2$/He gas with argon (15 min; 4000 ml/gcat/h).
The argon was replaced by hydrogen at 230° C.
In an activation step, increasing temperature from 230 to 425° C. in hydrogen (8000 ml/gcat/h) at 1° C./min, at atmospheric pressure, and a hold time of 7 hours at 425° C., followed by cooling down to 230° C. in hydrogen.

Example 32 was tested for Fischer-Tropsch synthesis (FTS) at 230° C. in a hydrogen/CO mixture at 16 bar. The relative FTS activity and methane selectivity are shown in Table 11.

TABLE 11

| Catalyst | Run number | Relative FTS activity[1] | Relative $CH_4$ selectivity[1] |
|---|---|---|---|
| Example 2 (comparative) | 101-R3 | 1.00 | 1.00 |
| Example 10 (inventive) | 154-R2 | 1.65 | 0.70 |
| Example 32 (inventive) | 204-R2 | 1.35 | 0.85 |

2) Expressed relative to Example 2 after 1 day online. Errors are for relative activity +/− 0.08; for relative $CH_4$ selectivity 0.05

Table 11 shows that heat treatment under oxidative conditions, in between the carbiding step and the activation step, results in lower FTS activity and higher methane selectivity.

Example 33

XRD20120053; Inventive

In situ XRD measurements were performed during a carbide formation experiment.

The initial catalyst precursor of Example 1 was activated by means of the following procedure in the in-situ XRD reaction chamber:

Increasing temperature from 25 to 425° C. in hydrogen at 5° C./min, atmospheric pressure, and a hold time of 8 hours at 425° C., followed by cooling down to 200° C. in hydrogen. Hydrogen was replaced by helium (30 min). The helium was replaced by CO at 200° C.

In a carbide formation step, treatment in CO, the temperature was raised from 200 to 230° C. at 5° C./min, and the pressure was increased to 5 bar. This treatment was done at 230° C. for 9.5 hours. The temperature was decreased to 180° C. and the pressure was reduced to atmospheric pressure. CO was replaced by helium (30 min;). The helium was replaced by hydrogen at 180° C.

In an activation step, increasing temperature from 180 to 425° C. in hydrogen at 1° C./min, at atmospheric pressure, and a hold time of 8 hours at 425° C.

The phases present after the carbiding step, as analysed by means of XRD, are presented in Table 12.

TABLE 12

| Treatment | $Al_2O_3$ (m %) | Co(fcc) (m %) | $Co_2C$ (m %) | $Co_xAl_yO_4$ (m %) |
|---|---|---|---|---|
| Carbided | 79 | 1 | 18 | 3 |

From Table 12 it can be seen that after the carbiding step there is 18% $Co_2C$ present in the total catalyst (including the alumina support), which can be calculated to be 82% $Co_2C$ of the total amount of cobalt present.

Example 34

Inventive

An initial catalyst precursor sample prepared according to the procedures from Example 23, was activated by means of the following procedure in a fluidized bed reactor:

Increasing temperature from 25 to 425° C. in hydrogen (4500 ml/gcat/h) at 1° C./min, atmospheric pressure, and a hold time of 5 hours at 425° C., followed by cooling down to 230° C. in hydrogen.

Hydrogen was replaced by argon (60 min; 2000 ml/gcat/h).

The argon was replaced by CO at 230° C.

In a carbide formation step, treatment in CO (4000 ml/gcat/h) at 230° C. for 6 hours at 6 bar, followed by cooling down to 180° C.

CO was replaced by argon (60 min; 2000 ml/gcat/h).

The argon was replaced by hydrogen at 180° C.

In an activation step, increasing temperature from 180 to 425° C. in hydrogen (4500 ml/gcat/h) at 1° C./min, at atmospheric pressure, and a hold time of 7 hours at 420° C.

This was followed by cooling down to room temperature in hydrogen, whereafter the catalyst was unloaded in molten wax under an argon atmosphere.

The wax coated activated catalyst samples of Examples 23 and 34 were loaded into a laboratory slurry CSTR reactor and Fischer-Tropsch synthesis (FTS) was performed at 230° C. in a hydrogen/CO mixture at 20 bar. The relative FTS activity and methane selectivity are shown in Table 13.

TABLE 13

| Catalyst | Run number | Relative FTS activity[1] | Relative $CH_4$ selectivity[1] |
|---|---|---|---|
| Example 23 (comparative) | BG034 | 1.00 | 1.00 |
| Example 34 (inventive) | CG075 | 1.58 | 0.73 |

2) Expressed relative to Example 23 after 3 days on line. Errors are for relative activity +/− 0.05; for relative $CH_4$ selectivity 0.03

The invention claimed is:

1. A process for preparing a cobalt-containing hydrocarbon synthesis catalyst, which process includes
   in a carbide formation step, treating an initial catalyst precursor comprising a catalyst support supporting cobalt, with a CO containing gas for longer than 1 hour at a temperature $T_1$, where 210° C.<$T_1$<260° C., to convert the cobalt to cobalt carbide thereby obtaining a cobalt carbide containing catalyst precursor, the CO containing gas (when it contains $H_2$) not having a CO to $H_2$ molar ratio equal to or less than 33:1, the carbide formation step being carried out under non-oxidative conditions and wherein the cobalt of the catalyst support supporting cobalt is formed in a reduction step wherein the catalyst support supporting a cobalt compound is subjected to reduction in a reducing gas to reduce the cobalt compound to cobalt; and
   in a subsequent activation step, subjecting the cobalt carbide containing catalyst precursor to treatment with a hydrogen containing gas at a temperature $T_2$, where $T_2$ is at least 300° C., to convert the cobalt carbide to cobalt metal thereby activating the cobalt carbide containing catalyst precursor and obtaining a cobalt-containing hydrocarbon synthesis catalyst.

2. The process according to claim 1, wherein 230° C.≤$T_1$≤250° C.

3. The process according to claim 1, wherein the CO containing gas is pure CO, and wherein the CO partial pressure of the CO containing gas during the carbide formation step is above 3 bar.

4. The process according to claim 1, wherein the treatment of the initial catalyst precursor with the CO containing gas is effected by contacting the initial catalyst precursor with the CO containing gas in a fluidised bed of particles of the initial catalyst precursor, with the CO containing gas acting as a fluidising medium for the bed of the initial catalyst precursor particles.

5. The process according to claim 1, wherein the cobalt carbide containing catalyst precursor is directly subjected to the activation step without first subjecting the precursor to heat treatment above 100° C. under oxidative conditions which causes oxidation of the cobalt carbide.

6. The process according to claim 5 wherein, prior to activation of the cobalt carbide containing catalyst precursor, no heat treatment thereof above 35° C. takes place under oxidative conditions which causes oxidation of the cobalt carbide.

7. The process according to claim 1 wherein, in the activation step, 350° C.≤$T_2$<500° C.

8. The process according to claim 1, wherein the hydrogen containing gas used in the activation step contains at least 90 volume % hydrogen, with the balance, if any, comprising one or more inert gases which are inert in respect of the cobalt carbide during the activation step.

9. The process according to claim 1, wherein the treatment of the cobalt carbide containing catalyst precursor with the hydrogen gas in the activation step is by contacting the hydrogen gas with the cobalt carbide containing catalyst precursor in a fluidised bed of particles of the cobalt carbide containing catalyst precursor, with the hydrogen gas acting as a fluidising medium for the bed of cobalt carbide containing catalyst precursor particles.

10. The process according to claim 1, wherein the treatment with the hydrogen containing gas in the activation step is carried out at a pressure from 0.6 to 1.5 bar(a).

11. The process according to claim 1, wherein the treatment with hydrogen containing gas in the activation step is carried out at a pressure of from 1.5 bar(a) to 20 bar(a).

12. The process according to claim 1, wherein a GHSV of the hydrogen containing gas of from 1 to 100 liters per hour per gram of catalyst precursor is employed.

13. A process for producing hydrocarbons, the process comprising preparing a cobalt-containing hydrocarbon synthesis catalyst according to the process of claim 1; and contacting hydrogen with carbon monoxide at a temperature above 100° C. and at a pressure of at least 10 bar in the presence of the cobalt-containing hydrocarbon synthesis catalyst, thereby producing hydrocarbons and, optionally, oxygenates of hydrocarbons in a Fischer-Tropsch synthesis process.

\* \* \* \* \*